United States Patent
Dervaux et al.

(10) Patent No.: US 7,540,707 B2
(45) Date of Patent: Jun. 2, 2009

(54) LINK DEVICE BETWEEN AN ENCLOSURE FOR PASSING COOLING AIR AND A STATOR NOZZLE IN A TURBOMACHINE

(75) Inventors: Alexandre Dervaux, Paris (FR); Sabine Bermond, Paris (FR)

(73) Assignee: SNECMA, Paris (FR)

( * ) Notice: Subject to any disclaimer, the term of this patent is extended or adjusted under 35 U.S.C. 154(b) by 393 days.

(21) Appl. No.: 11/385,929

(22) Filed: Mar. 22, 2006

(65) Prior Publication Data

US 2006/0216140 A1    Sep. 28, 2006

(30) Foreign Application Priority Data

Mar. 23, 2005   (FR) .................................. 05 02880

(51) Int. Cl.
*F01D 9/02* (2006.01)
(52) U.S. Cl. ........................ 415/135; 415/115
(58) Field of Classification Search ................ 415/115, 415/135, 191, 211.2
See application file for complete search history.

(56) References Cited

U.S. PATENT DOCUMENTS

| | | |
|---|---|---|
| 3,721,089 A | 3/1973 | Morrison et al. |
| 5,603,531 A | 2/1997 | Maier |
| 5,964,250 A * | 10/1999 | Mueller ................ 138/109 |

FOREIGN PATENT DOCUMENTS

| | | |
|---|---|---|
| DE | 196 44 543 A1 | 4/1998 |
| EP | 0 040 268 A1 | 11/1981 |
| EP | 0 919 774 A2 | 6/1999 |
| EP | 1 164 250 A2 | 12/2001 |
| EP | 1 291 491 A2 | 3/2003 |
| EP | 1 308 674 A2 | 5/2003 |
| FR | 2.027.667 | 10/1970 |
| GB | 790248 | 2/1958 |
| JP | 2000-274261 | 10/2000 |

OTHER PUBLICATIONS

U.S. Appl. No. 11/385,929, filed Mar. 22, 2006, Dervaux, et al.
U.S. Appl. No. 11/385,659, filed Mar. 22, 2006, Dervaux, et al.

\* cited by examiner

*Primary Examiner*—Igor Kershteyn
(74) *Attorney, Agent, or Firm*—Oblon, Spivak, McClelland, Maier & Neustadt, P.C.

(57) ABSTRACT

A link device between an enclosure for passing cooling air and a stator nozzle in a turbomachine, the device comprising metal tubes having their ends mounted in leaktight manner in orifices in a casing and in orifices in the stator nozzle, one end of each tube being engaged in a ring having an outer collar movable in sliding between two surfaces carried by the nozzle, the guide surface situated beside the casing being held stationary relative to the nozzle, while the other guide surface is movable axially relative to the nozzle and is associated with return means urging it towards the casing.

11 Claims, 4 Drawing Sheets

LINK DEVICE BETWEEN AN ENCLOSURE FOR PASSING COOLING AIR AND A STATOR NOZZLE IN A TURBOMACHINE

The present invention relates to a link device between an enclosure for passing cooling air, such as a source of cooling air or a plenum enclosure, and a stator nozzle in a turbomachine, such as an airplane turbojet or turboprop.

BACKGROUND OF THE INVENTION

In a turbomachine, the stator nozzles that are exposed to high temperatures, in particular those downstream from the combustion chamber, include internal cavities for passing a flow of cooling air coming from a radially outer enclosure, part of which air can be diffused into the passage for passing the flow of combustion gas via holes formed in the vanes, and part of it can be exhausted into a radially inner enclosure.

Link means are provided between these enclosures and the stator nozzles to allow cooling air to pass, while minimizing losses and leaks at the interfaces, the link means comprising metal tubes having their ends mounted in leaktight manner in orifices in a casing and in orifices in the stator nozzles.

While the turbomachine is in operation, the casing, and above all the stator nozzles, expand thermally and are subjected to high levels of vibration, thereby generating relative displacements and changes in alignment between the orifices in the casing and those in the nozzles.

To compensate for these relative displacements and changes in alignment, link tubes are used having ends that are enlarged in such a manner as to allow for a small amount of pivoting of the ends of the tubes in the orifices in the casing and in the nozzles, these ends being mounted as tight-fits in the orifices in order to ensure that the assembly is sufficiently leaktight.

Nevertheless, that solution is not satisfactory insofar as mounting the ends of the tubes as tight-fits limits the extent to which they can pivot and leads to zones that present high degrees of wear due to friction against the inside surfaces of the orifices in the casing and in the nozzles, which can lead to leaks at said ends, and even to the link tubes being lost or failing.

According to European patent EP-A2-1 164 250, one solution to this problem consists in associating a ring with each link tube, the ring being mounted between one of the ends of the tube and a nozzle, and carrying an outer collar that can be moved in sliding between a surface of the nozzle and a surface of an annular element fitted on the nozzle and held stationary relative thereto.

Nevertheless, that solution is unsatisfactory since it does not make it possible to compensate relative displacements in rotation between the casing and the nozzle without leading to high degrees of wear in the link tube.

OBJECTS AND SUMMARY OF THE INVENTION

A particular object of the invention is to provide a solution to this problem that is simple, inexpensive, and effective.

To this end, the invention provides a link device between an enclosure for passing cooling air and a stator nozzle in a turbomachine such as an airplane turbojet, the device comprising metal tubes having their ends mounted to slide in leaktight manner in orifices in a casing of the enclosure and in orifices in the stator nozzle, one end of each tube being engaged in a ring having a radially outer collar that is slidable between two guide surfaces that extend perpendicularly to the axis of the orifices and that are carried by said nozzle, wherein the guide surface situated beside the casing is held stationary relative to the nozzle, while the other guide surface is movable axially relative to the nozzle and is associated with return means urging it towards the casing.

The device of the invention makes it possible to absorb offsets and changes in alignment between the orifices in the casing and in the nozzle that result from the turbomachine operating, while nevertheless ensuring continuity of the fluid link between the above-mentioned enclosure and the stator nozzle, and while avoiding wear at the ends of the tubes, and avoiding applying stresses to said tubes.

At each tube, the relative displacements in translation and in rotation between the casing of an enclosure and the nozzle are compensated by the collar of the ring sliding between the guide surfaces of the nozzle and by the return means being compressed resiliently. By way of example, the return means may be a coil spring or a Belleville spring washer.

The tubes therefore do not contribute to compensating the relative displacements between the casing and the nozzle, thereby limiting the extent to which they suffer wear by friction and thus increasing their lifetime.

Advantageously, the end of the tube mounted in the ring includes a surface constituting a segment of a sphere that can pivot and slide in the ring. The other end of the tube may also include a surface constituting a segment of a sphere that can slide and pivot in an orifice in the casing of the enclosure.

Advantageously, the rings of the device of the invention can be associated with prior art tubes having enlarged ends, which is very inexpensive.

The invention also provides a turbomachine such as an airplane turbojet or turboprop, the turbomachine including at least one device as defined above.

BRIEF DESCRIPTION OF THE DRAWINGS

The invention can be better understood and other characteristics and advantages of the invention appear on reading the following description made by way of non-limiting example and with reference to the accompanying drawings, in which.

MORE DETAILED DESCRIPTION

Figure 1:
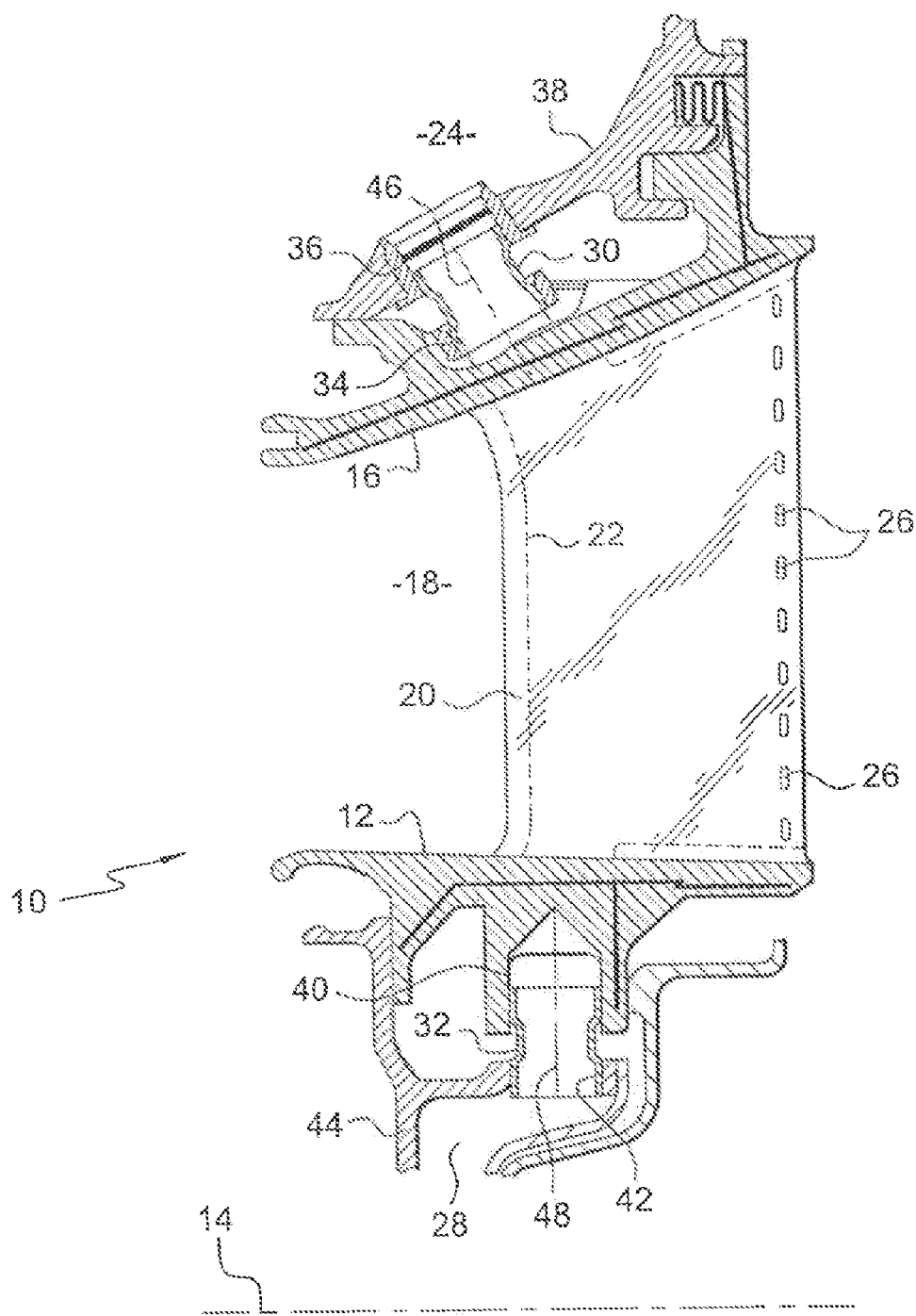
FIG. 1 is a fragmentary diagrammatic half-view in axial section of a stator nozzle connected to two cooling air flow enclosures via link devices of the prior art.

FIG. 1 is a fragmentary diagrammatic half-view in axial section of a stator nozzle 10 in a turbomachine, having a radially inner annular wall 12 of axis 14 and a radially outer frustoconical wall 16 of axis 14, sloping towards the axis 14 at its upstream end, the annular walls defining between them an annular gas flow passage 18 for gas coming from a combustion chamber (not shown) of the turbomachine, with vanes 20 extending radially between the annular walls.

Each vane 20 has an internal cavity 22 for circulating cooling air coming from a feed enclosure 24 located radially outside the wall 16 of the nozzle, part of the air being diffused into the annular passage 18 via slots 26 in the vanes 20, and part being exhausted into an enclosure 28 located radially inside the wall 12 of the nozzle.

The cavities 22 in the vanes are connected to the outer and inner enclosures 24 and 28 by link devices comprising respective metal tubes 30 and 32.

The tubes 30 for passing air from the outer enclosure 24 to the cavities 22 in the vanes have their ends engaged in leaktight manner in bushings 34, 36 secured in orifices formed in the wall 16 of the nozzle, and in orifices formed in a casing 38 of the enclosure 24, respectively.

The tubes 32 for passing air from the cavities 22 in the vanes to the inner enclosure 28 have their ends engaged in leaktight manner in orifices 40, 42 in the wall 12 of the nozzle and in an annular rim of a casing 44 of the enclosure 28, respectively.

When the turbomachine is in operation, the thermal expansion of the stator nozzle 10 and the vibration of the turbine engine lead to relative displacements in translation and in rotation for each tube 30, 32 between the nozzle 10 and the casings of the enclosures 24 and 28.

Figure 2:
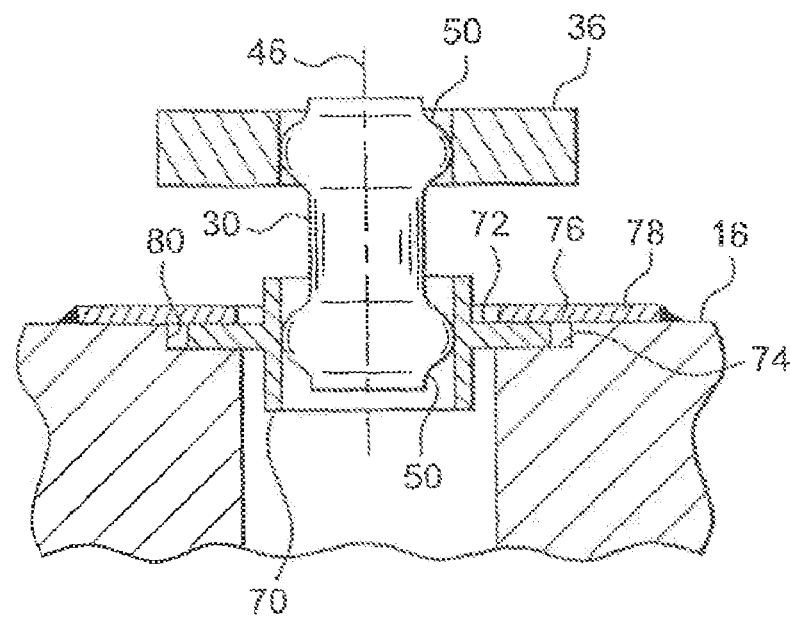
FIGS. 2 and 3 are fragmentary diagrammatic views in axial section of a prior art link device.
Figure 3:
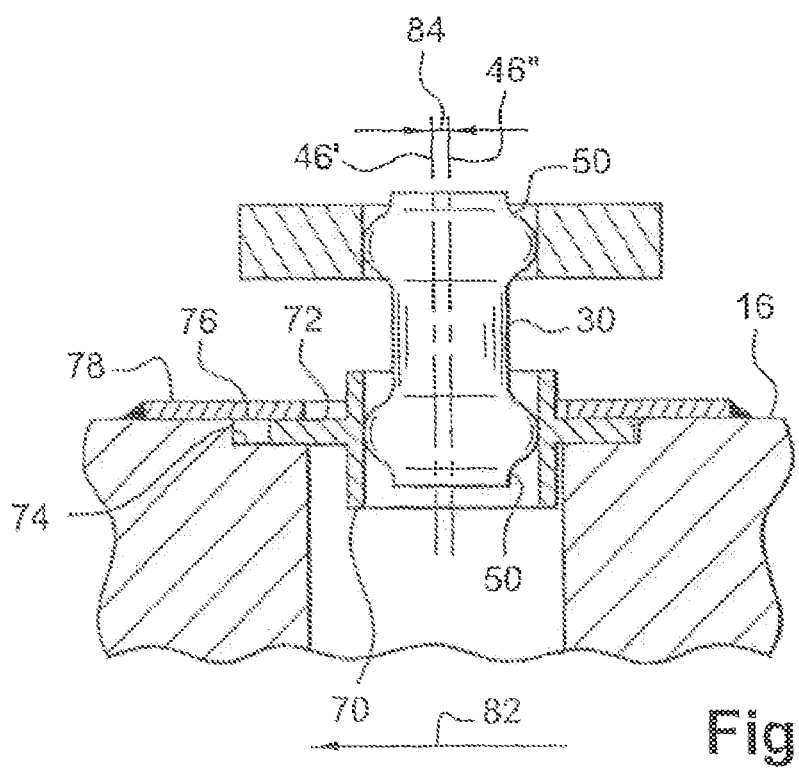

FIGS. 2 and 3 are fragmentary diagrammatic views in axial section of a prior art device in which a tube 30 is engaged via one of its ends 50 in a cylindrical ring 70 having on its outer surface a radial collar 72 movable in sliding between a first guide surface 74 extending perpendicularly to the axis 46 of the orifice in the nozzle and in the stationary bushing 36, and formed in the wall 16 of the nozzle, and a second guide surface 76 extending parallel to the surface 74 and formed by a washer 78 disposed coaxially about the orifice in the wall 16 of the nozzle and secured to the wall 16.

The outside diameter of the ring 70 is smaller than the inside diameter of the washer 78 and of the orifice in the nozzle, and the outside diameter of the collar 72 is smaller than the inside diameter of a recess 80 in the nozzle that receives the collar 72, thereby enabling the collar 72 to slide between the guide surfaces 74 and 76, and enabling the ring 70 to move in a plane perpendicular to the axis 46.

For each tube, the relative displacements in translation between the casing of the enclosure and the nozzle are compensated by the ends of the tube 30 sliding in the stationary bushing 36 and in the ring 70, and by the collar 72 of the ring sliding between the guide surfaces 74 and 76 of the nozzle.

Nevertheless, relative displacements in rotation between the casing of the enclosure and the nozzle are compensated by the ends of the tubes 30 pivoting in the stationary bushing 36 and in the ring 70, thereby leading to large amounts of wear on the ends of the tube.

FIGS. 4 to 8 are fragmentary diagrammatic views in axial section of a device of the invention, in which an annular washer 86 coaxial about the orifice in the wall 16 of the nozzle is mounted to move axially in the orifice, and is biased by a return spring 88 mounted between the radially inner annular surface of the washer 86 and the end wall 90 of a recess in the nozzle, the spring 88 urging the washer 86 towards the stationary bushing 36 of the casing of the enclosure in order to clamp the radial collar 72 between said washer 86 and the stationary washer 78.

Figure 4:
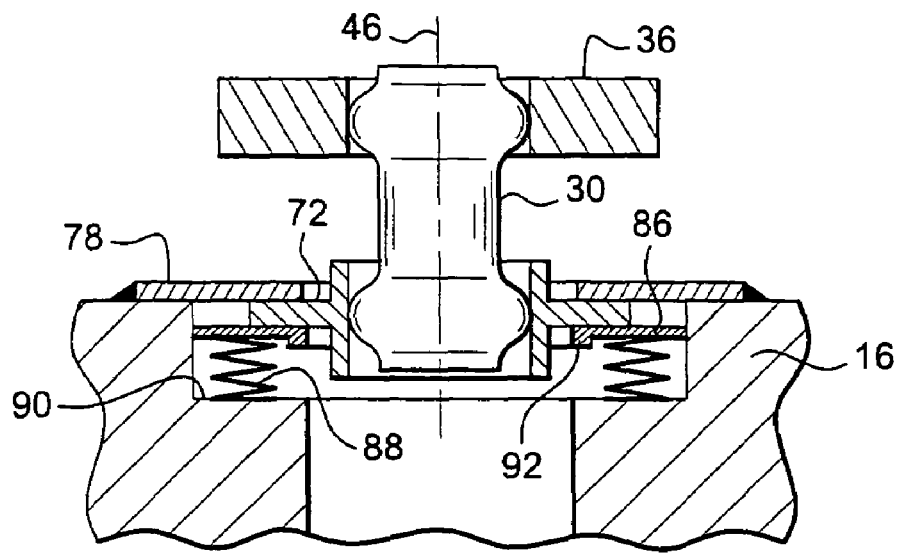
FIGS. 4 to 8 are fragmentary diagrammatic views in axial section of the link device of the invention.
Figure 5:
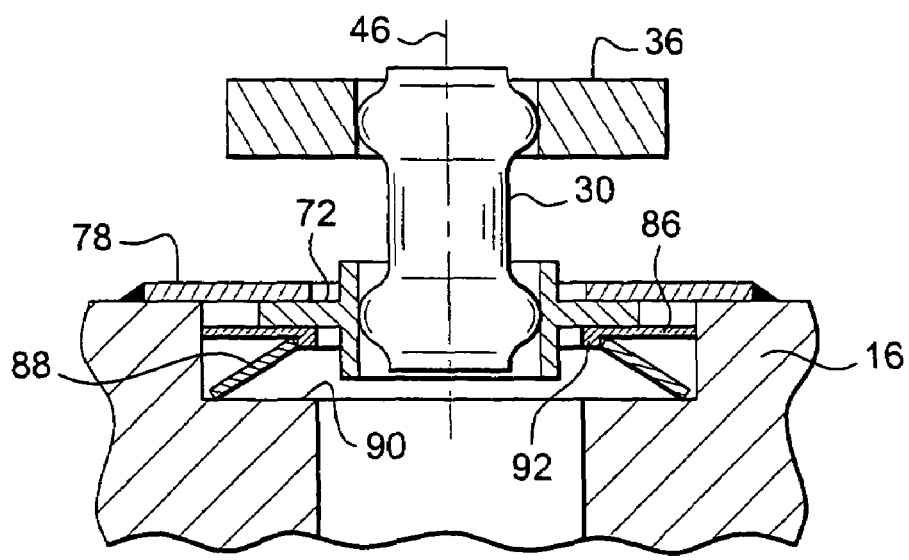

In FIG. 4, the return spring 88 is formed by a coil spring, and in FIG. 5 by a Belleville spring washer, the washer 86 having a radially inner cylindrical rim 92 on its inside edge enabling the return spring 88 to be centered and guiding while it is being compressed.

The inside diameter of the washer 86 is substantially equal to the inside diameter of the orifice in the nozzle and the inside diameter of the washer 78.

Figure 6:
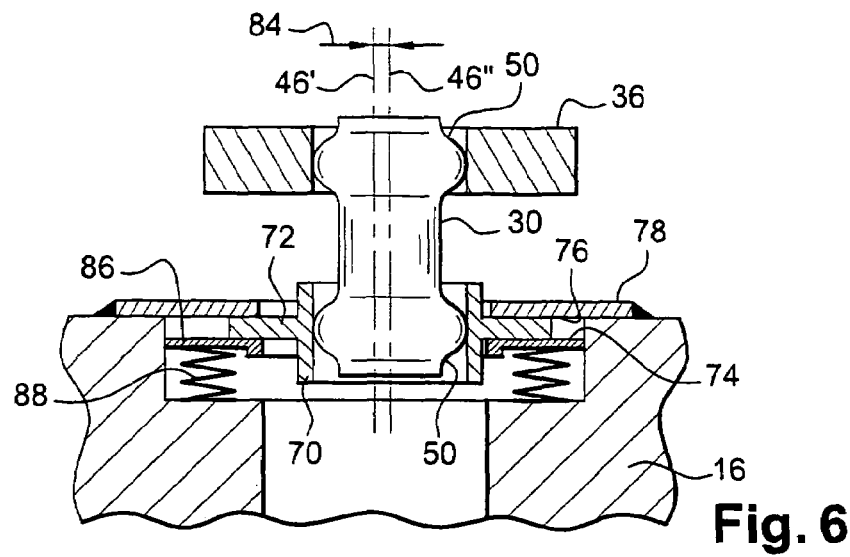
Figure 7:
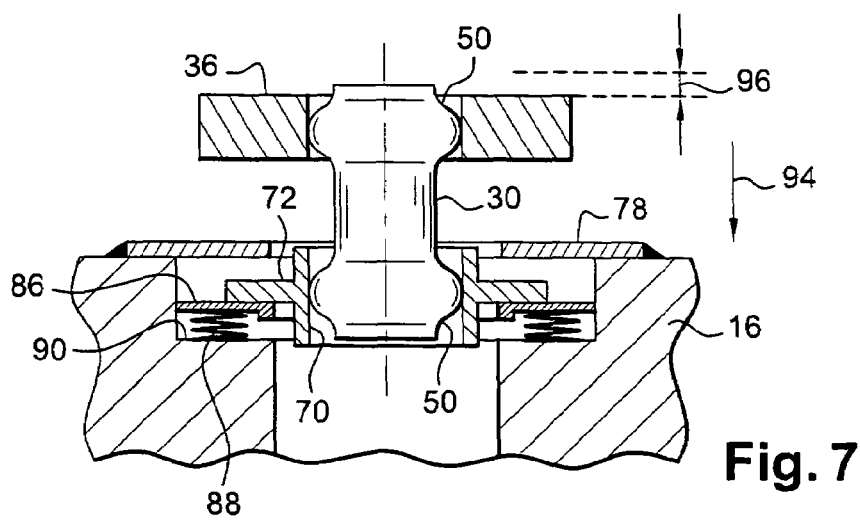
Figure 8:
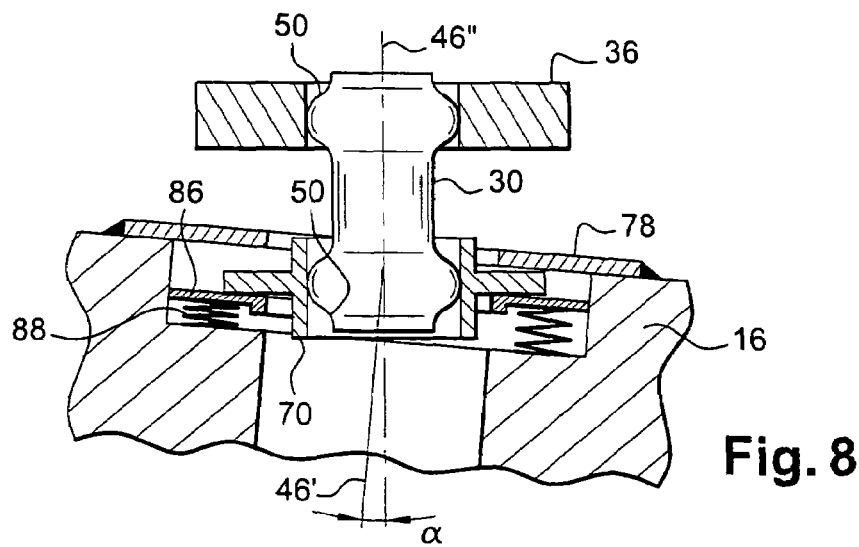

For each tube, the relative displacements between the casing of the enclosure and the nozzle are compensated by the collar 72 of the ring sliding between the guide surfaces 74, 76 of the nozzle, as shown in FIG. 6, and/or by the return spring 88 compressing, as shown in FIGS. 7 and 8.

In FIG. 7, the casing of the enclosure is moved in the direction of arrow 94 towards the nozzle, through a distance 96 compensated by the washer 86 moving towards the nozzle and by the spring 88 being compressed between the washer 86 and the end wall 90 of the recess.

In FIG. 8, the axis 46' of the orifice in the nozzle is tilted through an angle α relative to the axis 46" of the stationary bushing 36, and this angular offset is compensated by the washer 86 moving towards the nozzle and by the return spring 88 being compressed, the ring 70 remaining in alignment with the axis 46" of the bushing 36, and its collar 72 extending obliquely between the washers 78 and 86.

In a variant, the rings 70 may be mounted on the ends of the tubes engaged in the stationary bushings 36 of the casing.

The device of the invention may also be mounted between the nozzle 10 and the casing 44 of the inner enclosure 28.

In general, the device of the invention makes its possible to absorb relative displacements between the casing of the enclosure and the stator nozzle without there being any sliding or pivoting of the enlarged or spherical ends 50 of the tubes 30 in the bushings 36 or in the rings 70 so long as these relative displacements remain smaller than the displacement strokes of the collars 72 and/or the compression strokes of the springs 88. This avoids any wear at the ends 50 of the tubes 30, and it is only once the relative displacements between the casing of the enclosure and the nozzle exceed the above-specified displacement strokes of the collars and/or of return spring compression that any pivoting and/or sliding of the ends 50 of the tubes is liable to occur.

The device of the invention is thus capable of absorbing relatively large amounts of displacement between the casing of the enclosure and the nozzle, while providing continuity for the fluid links between the casing and the nozzle, and while minimizing the risks of the link tubes wearing, and minimizing the stresses that are applied thereto.

What is claimed is:

1. A link device between an enclosure configured to pass cooling air and a stator nozzle in a turbomachine such as an airplane turbojet, the device comprising:

metal tubes with ends mounted to slide in a leaktight manner in orifices in a casing of the enclosure and in orifices in the stator nozzle, a first end of each tube being engaged in a ring having a radially outer collar that is slidable between first and second guide surfaces that extend perpendicularly to an axis of the orifices and that are carried by said nozzle, wherein the first guide surface is situated beside the casing and is held stationary relative to the nozzle, and the second guide surface is movable axially relative to the nozzle and is disposed on a member abutting return means configured to urge said second guide surface towards the casing.

2. The device according to claim 1, wherein the return means is a coil spring or a Belleville spring washer.

3. The device according to claim 1, wherein the first end of the tube mounted in the ring includes a surface, including a shape of a segment of a sphere, that is mounted to pivot and slide in the ring.

4. The device according to claim 1, wherein a second end of the tube includes a surface, including a shape of a segment of a sphere, that is mounted to slide and pivot in an orifice in the casing of the enclosure.

5. A turbomachine such as an airplane turbojet or turboprop, the turbomachine including at least one device according to claim 1.

6. The device according to claim 1, wherein the second guide surface is formed by an annular washer coaxial about the orifice of the nozzle, the return means being mounted between an annular surface of the washer and a wall of the nozzle.

7. The device according to claim 6, wherein the annular washer has a radially inner cylindrical rim that centers and guides the return means while said return means is compressed.

8. The device according to claim 1, wherein the casing of the enclosure is located radially outside a radially outer wall of the stator nozzle.

9. The device according to claim 1, wherein the casing of the enclosure is located radially inside a radially inner wall of the stator nozzle.

10. The device according to claim 6, wherein the return means is directly abutted against the annular washer and directly abutted against a wall of the nozzle.

11. The device according to claim 1, wherein the second guide surface remains in contact with the radial collar during any state in which the radial collar is not in contact with the first guide surface.

* * * * *